(12) United States Patent
Fletcher

(10) Patent No.: US 6,504,330 B2
(45) Date of Patent: Jan. 7, 2003

(54) SINGLE BOARD MOTOR CONTROLLER

(75) Inventor: Mitchell S. Fletcher, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/874,502

(22) Filed: Jun. 5, 2001

(65) Prior Publication Data

US 2002/0180388 A1 Dec. 5, 2002

(51) Int. Cl.[7] .............................................. H02K 23/00
(52) U.S. Cl. .................... 318/254; 318/138; 318/439; 318/721; 318/722
(58) Field of Search .................................. 318/138, 254, 318/439, 721, 722, 610, 618, 628, 599, 801; 363/98

(56) References Cited

U.S. PATENT DOCUMENTS 5,483,436 A * 1/1996 Brown et al. ................. 363/98
6,222,332 B1 * 4/2001 Flaetcher et al. ........... 318/254

* cited by examiner

Primary Examiner—Khanh Dang
(74) Attorney, Agent, or Firm—Ian D. MacKinnon

(57) ABSTRACT

A digital motor controller circuit including a an energy storage device, a bus protection circuit, an input signal selector, a combiner, a calibration device for altering parameters for different applications, a compensator, a motor driver circuit, and feedback circuitry for controlling a motor with a minimum of cost and space requirements.

18 Claims, 2 Drawing Sheets

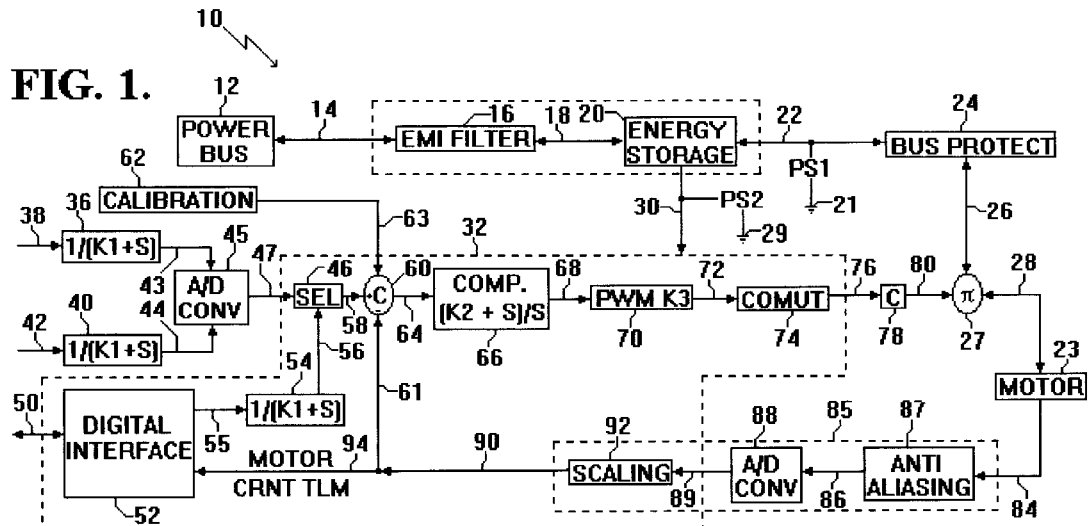

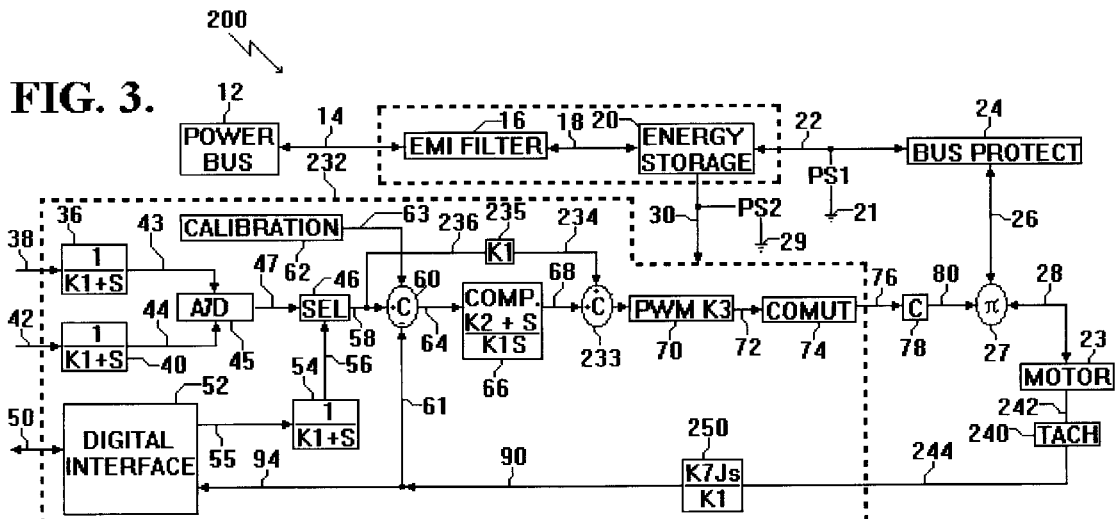

SINGLE BOARD MOTOR CONTROLLER

CROSS REFERENCE TO RELATED APPLICATIONS

Patent application entitled "Single Board Motor Controller," Ser. No. 09/397,679, filed Sep. 16, 1999 and assigned to Honeywell Inc., is related to the present application and is incorporated herein by reference.

BACKGROUND OF THE INVENTION

1. Field of the Invention

The present invention relates to an improved motor control circuit and architecture, and more particularly to a low-cost, high-performance, high-volume production motor controller for use with reaction wheel assemblies (RWAs), control moment gyroscopes (CMGs) and pointing systems on space vehicles where size, weight, radiation, and reliability play important roles.

2. Description of Previous Systems

Honeywell presently produces an analog motor control system identified as the Constellation Series, an embodiment of which, the HR14X, is described in the above-referred-to related application. The Constellation Series has met the design requirements for advanced systems such as the Teledesic series of RWAs. However, with changing satellite markets there is an ever-increasing requirement for minimal-cost, minimal-size, and high-volume production devices made without compromising quality or performance. Because of the technology limitations imposed by the analog implementation of the Constellation Series RWAs, both a digital gate array and an analog control hybrid are presently required in addition to a plurality of electronic components. This undesirably increases the size and cost of the system.

SUMMARY OF THE INVENTION

The present invention draws upon the high quality and performance of the HR14X but includes a number of design modifications that further reduce the size, weight, and cost of the controller, and allow for a more flexible implementation. For example, the control function is now located on one device, the gate array, whereas in the previous system, this function was located on two devices, referred to as the digital gate array and the analog control hybrid, each about the size of the gate array of the present invention. The present invention also introduces a calibration function to the system which, with both analog and digital command paths, allows ease of reconfiguration between various user requirements. This is desirable since there are several parameters that are unique to each embodiment of the motor controller (e.g., momentum, reaction torque, torque scale factor, wheel speed, and bus voltage). Prior to the present invention, these parameters had to be "designed in" to each embodiment. In the present invention, with the introduction of the calibration function, only the calibration table needs be changed to account for the parameter changes.

In the present invention, production is improved by a less complex implementation that can be assembled faster and with improved quality and a more radiation tolerant implementation can be realized due to the elimination of critical analog components. More particularly, the present invention uses full digital circuits that require far fewer parts than an analogue design resulting in reduced size and cost. Specifically, the improved motor control circuit provides an approximate a 20% saving in size and a 10% savings in weight.

BRIEF DESCRIPTION OF THE DRAWINGS

FIG. 1 shows a control system block diagram of the control functions of a first embodiment of the motor controller;

FIG. 2 shows a physical block diagram of the electronics of the first embodiment of the motor controller;

FIG. 3 shows a control system block diagram of a second embodiment of the control functions of the motor controller; and FIG. 4 shows a physical block diagram of the electronics of the second embodiment of the motor controller.

DETAILED DESCRIPTION OF THE PREFERRED EMBODIMENTS

Referring to FIG. 1, a block diagram for the control functions of a first embodiment of the motor control circuit, 10, of the present invention are shown. An external power bus, 12, supplies a positive DC voltage and current on a line, 14, to an electro-magnetic interference filter, 16, which filters out unwanted components such as noise and power bus fluctuations. The filtered voltage is presented over a line, 18, to an energy storage device, 20. Energy storage device, 20, supplies power for a first DC power source, ps1, having a first ground connection, 21, over a line, 22, and operates to provide power for a Motor shown as box, 23, through a bus protection circuit, 24, line, 26, and a Multiplier, 27 and a line 28. Because power is generated from the Motor, 23, when commanding a slow down of the rotating element (detorque), the lines, 14, 18, 22, 26 and 28, are seen as double ended arrows to show that the signals pass in both directions. The bus protection circuit, 24, operates to protect the internal circuits from damage that may be caused by improper operation by the user or system level faults. Energy storage device, 20, is also used to provide a second DC power source, ps2, having a second ground connection, 29, over a line, 30, which operates to provide power to the components of a custom gate array circuit or control circuit identified by reference numeral, 32, to be described. The two ground references, 21 and 29, operate to provide electrical isolation between the Gate Array circuit, 32, and the Motor, 23.

Gate Array circuit, 32, constitutes an RWA control with an innovative arrangement of control components that is used to implement the majority of the control functions into a single device and which is miniaturized to further reduce the size and cost of the previous arrangement described in the above mentioned related application.

In FIG. 1, a first desired analogue torque signal is presented to a first input filter, 36, external to circuit, 32, on a line 38. A second desired analog torque signal may be presented to a second input filter, 40, external to circuit, 32, on a line, 42. After filtering, the desired analog command torque signals appear on lines 43 and 44 and these are converted to digital signals by an A/D converter, 45, and presented to a Selector, 46, by way of a line, 47.

External to circuit 32, a desired digital torque input command signal is supplied on a shared digital input/output, 50, to a Digital Interface circuit, 52, internal to circuit 32. Interface circuit, 52 may be either parallel or serial. The desired signal is then presented to a digital filter shown as box, 54, via a line, 55. The filtered digital command signal is presented to Selector, 46, over a line 56. Selector, 46, operates to select one of the desired filtered torque command signals and present it via a line, 58, to a Combiner, 60. Combiner, 60, also has a feedback input on a line, 61, which contains the wanted outputs from the Motor, 23, and unwanted errors and noise from the system, as will be explained. Combiner, 60, also accepts a calibration signal from a Calibration box, 62, external to circuit, 32, over a line, 63. Calibration box, 62, may be a look up table that contains a list of constants located in a PROM or other type of non-volatile storage. A selected constant is determined by a multiply and accumulate, MAC, circuit, to be described in connection with FIG. 2, so that corrections can be introduced for each of the above mentioned parameters that are unique to each embodiment of the motor controller, e.g., momentum, reaction torque, torque scale factor, wheel speed, and bus voltage. The proper correction signal is presented on line, 63, to the Combiner, 60, which operates to combine the inputs on lines, 58 and 61, as modified by the input on line 63, and to present the combined signal via a line, 64, to a digital Compensator 66. Digital Compensator, 66, operates to nullify any error signals on line, 64, and to produce an error free command signal on a line, 68, for presentation to a Pulse Width Modulator, PWM, 70. PWM, 70, operates to change the command signal so as to produce an average command signal on a line, 72. Specifically, PWM, 70, changes the command signal (represented by a current) to an average command (represented by an average voltage). The average command signal on line, 72, is used to control the motor, 23, at a reduced voltage without the power dissipation encountered by such devices as linear amplifiers. The use of a PWM to replace a linear amplifier is known in the art and is accomplished by turning the signal on and off to produce an average voltage (as compared to a linear amplifier which reduces the voltage by dividing the signal and dissipating the excess power in a resistive device). The average command signal on line, 72, is presented to a Commutator, 74, which operates to provide a motor drive signal on a line, 76, that is characterized for presentation to the proper winding of the Motor, 23. Since the Motor, 23, and its associated components are supplied with power, ps1, on line, 22, which has a reference ground, 21, and since the components of gate array circuit, 32, are supplied with power, ps2, on a line, 30, which has a reference ground, 29, a Converter, 78, is used to receive the proper winding signal on line, 76, and to convert the signal from one having a ground reference, 29, to one having a ground reference, 21. The signal from Converter, 78, is presented to the Multiplier, 27, via a line, 80, to provide the final motor drive signal on line, 28. Multiplier, 27, takes the low level command signal average voltage and multiplies it by the bus voltage to create a high current signal capable of actuating Motor, 23, to create the desired torque. A line 84, is shown leading from Motor, 23, back to the Gate Array Circuit, 32 via a Converter, 85, and carries a feedback signal. The Converter, 85, comprising an Anti-Aliasing circuit, 87, an A/D converter, 88, and a Scaling circuit, 92, together operate to change the analog signal on line, 84, (referenced to ground, 21), to a digital feedback signal on line, 90, (referenced to ground, 29). The signal on line, 90, is fed back to Combiner, 60, via line 61 and is also presented to the Digital Interface circuit, 52, via a line, 94, to produce a motor current telemetry (TLM) signal at the shared digital input/output, 50.

FIG. 2 shows the electrical block diagram for the motor control circuit of the present invention. In FIG. 2, the various blocks, to be described, implement the functions corresponding to the elements of FIG. 1.

In FIG. 2, the Power Bus input, 100, is shown passing through in-line filters, 102, and a Power Switching circuit, 104, which is turned "on" and "off" by a Relay Control, 106, from an on/off input, 108, and produces an output on a line, 110, which is connected to an EMI Filter, 112. EMI Filter, 112, is connected to an Energy Storage circuit, 114, and from there to a Bus Protect circuit, 116, in a manner like that shown in the arrangement of FIG. 1. The Energy Storage, 114, is also connected by a line, 118, to a Secondary Power Supply box, 119, which provides various voltages shown by reference characters "a", "b" and "c" which voltages are used as required by the various components and other equipment of the system as will be described. In the preferred embodiment, voltage "a" is +5 volts referenced to the ground 21, of FIG. 1, voltage "b" is +5 volts referenced to the ground, 29, of FIG. 1 and voltage "c" is ±12 volts also referenced to the ground 29, of FIG. 1.

In FIG. 2, the RWA Gate Array circuit is identified by reference numeral 120, and is powered by voltage "a," as shown by arrow, 122. Gate Array circuit, 120, contains the elements shown by the following functional blocks: "Telemetry Register", 130, "Command Register", 132, "Sequencer", 134, "Dedicated Digital Multiply & Accumulate Computation Unit", 136, "Frame Timer", 138, "Pulse Width Modulator" (PWM) 140, "PWM Counter", 142, "Coefficient ROM", 144, "Clock" 146, and "Commutation Tachometer & Over speed Protection" 148. These blocks implement all of the functions corresponding to the elements within the dashed lines of the custom gate array circuit, 32, of FIG. 1 and are well known in the art. The "Dedicated Digital Multiply & Accumulate Computation Unit," 136, is a standard digital multiply and accumulate circuit which is set to perform the mathematical functions required by the circuit. For example, the MAC will perform the math (K2+S)/S and the math T/(K1+S), and thus implement the input filter, 54, the digital compensator, 66 of FIG. 1. It will also perform the scaling, 92, function of FIG. 1. Also, as mentioned above, the "Dedicated Digital Multiply & Accumulate Computation Unit," 136 will determine the constant to be used by the calibration unit, 62, of FIG. 1. These elements are powered by the voltage "a" from the secondary power circuit, 119, as shown by arrow 122. Blocks 184, 190, and 154 implement block 52 and can be configured in a number of ways known in the prior art.

An analog command, (AC) 150, external to the RWA gate array circuit gate array circuit, 120, is shown in FIG. 2 connected to a "Slow A/D" converter, 152, which produces a corresponding digital signal that is presented to the "Command Register", 132, in the gate array, 120. "Command Register," 132, also receives the digital command signal identified as "DC," 153, through a buffer, 154. The resulting command signal is presented to the "Dedicated Digital Multiply & Accumulate Computation Unit," 136, and its output is presented to the PWM", 140, that corresponds to the PWM box, 70, of FIG. 1. It should be noted that the selector, 46, of FIG. 1, is also implemented by the "Dedicated Digital Multiply & Accumulate Computation Unit," 136. The Commutator, 74, of FIG. 1, is shown in FIG. 2, as a "Commutation Tachometer and Over Speed Protection" box, 148, within the gate array, 120, which receives the PWM140 signal, position information from a "Hall Sensor", 155, through line, 156, and the clock signal from "Clock", 146, at 61.44 MHz, in the preferred embodiment. "Clock", 146, also presents a clock signal to PWM Counter, 142, which in turn produces a count signal to PWM 140, to Frame Timer, 138 and to both the "Dedicated Digital Multiply & Accumulate Computation Unit", 136 and the "Sequencer", 134. Sequencer," 134 supplies the master control sequence signal to the "Dedicated Digital Multiply & Accumulate Computation Unit," 136.

The output signals of the Gate Array circuit, 120, are, shown on lines, 162, and, as explained above, are referenced to a ground 29. The "Commutation Tachometer and Over Speed Protection" 148, is therefore connected to an Optical Isolator, 160, which converts the electrical signals to optical signals and then transfers them to electrical signals again but referenced to ground, 21, to produce outputs shown by reference numeral, 163, leading to a "Motor Driver", 164. "Bus Protect," 116, is also connected to "Motor Driver," 164. It will be noted that "Motor Driver", 164, is powered by sources "b" and "c", as seen by arrows 165 and 166, received from the "Secondary Power Supply", 119 and referenced to ground 21.

"Motor Driver," 164 contains the pre-driver circuits and a three-phase output, φA, φB and φC, for the motor windings shown by reference numerals 167A, 167B and 167C respectively. Hall sensors, 155, provide feedback to the "Commutation Tachometer and Over Speed Protection," 148, over line, 156.

The current in the windings 167A, 167B and 167C is sensed by "Current Sense Resistors," 170, and is presented to an "Differential Anti-Alias Filter," 172, over a line, 174. The output of the "Differential Anti-Alias Filter", 172, is converted to the necessary digital format by a "Fast A/D", 176 and the digital signal there from is presented on a line, 177, to the "Dedicated Digital Multiply & Accumulate Computation Unit", 136, in Gate Array, 120, where the scaling, 92, and closed loop summation, 60, of FIG. 1 are completed. The output of the "Differential Anti-Alias Filter", 172, is also presented on a line, 178, through a buffer, 179, to a motor current telemetry output identified as "MCT", 180, which provides a signal that enables the operator to read the motor currents. In similar fashion, an output from the "Commutator, Tachometer and Over Speed Protection", 148, is presented to a buffer, 184, and then to a tachometer output identified as "T", 186 to enable the operator to monitor the motor speed. Finally, an output from the "Commutator, Tachometer and Over Speed Protection," 148, is presented to the "Dedicated Digital Multiply & Accumulate Computation Unit," 136, via lines 181 and 185. "Dedicated Digital Multiply & Accumulate Computation Unit", 136, processes the digital data such as speed or torque, and produces a signal which is sent to the "Telemetry Register", 130, and to a buffer, 190, to provide a digital telemetry output identified as "DT", 191, that enables the operator to monitor the digital signals.

The embodiments of FIGS. 1 and 2 provide an improvement over the invention of the previous application in that the function of the RWA hybrid has been incorporated into the already existing gate array. The calibration for different parameters that are unique to each embodiment of the motor controller has also been greatly simplified. This embodiment also requires a less complex power supply. These changes make for a simpler physical implementation that costs less. It is therefore seen the implementation of FIGS. 1 and 2 provide a high volume production device without compromising quality or performance.

FIGS. 3 and 4 show a second embodiment of the present invention. The basic change over FIGS. 1 and 2 is in improving the feedback loop so that it is more accurate and employs fewer components for greater simplicity, as will be discussed below. Since FIGS. 3 and 4 are nearly the same as FIGS. 1 and 2, the reference numerals for components and functions in FIGS. 1 and 2 will be used in FIGS. 3 and 4 wherever they represent the same elements and new reference numerals will be used wherever the elements or functions are different.

In FIG. 3, the block diagram for the control function of the motor control circuit is identified by reference numeral, 200. The power bus, 12, the EMI Filter, 16, the Bus Protect, 24, the Multiplier, 27, the Motor, 23 and, the Energy Storage, 20, which supplies power PS1 at ground, 21, and PS2 at ground, 29, are connected in the same way as was described in FIG. 1.

The Gate Array circuit, 32, of FIG. 1, is modified in FIG. 3 and is identified by reference numeral 232. As in FIG. 1, the first desired analogue torque signal on line, 38, is presented to the first input filter, 36, which is now shown internal to circuit, 32. The second desired analog torque signal on line, 42, may be presented to the second input filter, 40, also shown internal to circuit, 32. After filtering, the desired analog command torque signals appear on lines 43 and 44 and are converted to digital signals by A/D converter, 45, and presented to Selector, 46, by way of line, 47.

The desired digital torque input command signal is supplied on the shared digital input/output, 50 to Digital Interface circuit, 52, internal to circuit 32. Interface circuit, 52, utilizes either parallel or serial data and produces a command signal that is passed to digital filter, 54, via line, 56. The filtered digital command signal is presented to Selector, 46, over line 56. As in FIG. 1, Selector, 46, operates to select one of the desired filtered torque command signals and present it via line, 58, to Combiner, 60. Combiner, 60, also has a feedback input on line, 61, and a calibration signal from Calibration box, 62, which is now internal to circuit, 32, on line, 63.

The feedback signal on line 61 is different from that used in FIGS. 1 and 2. More particularly, in the embodiment of FIGS. 3 and 4, the method of feedback control has been changed from current control feedback to speed control feedback. Current feedback provides only an approximation of torque whereas using speed and calculating delta speed over delta time provides an exact measurement of torque. Furthermore, speed feedback eliminates the need for the Fast A/D converter, 176, of FIG. 2, which may introduce some inaccuracies in the feedback loop, and its elimination not only improves accuracy but also simplifies the circuitry, as will be discussed in connection with FIG. 4.

As in FIG. 1, combiner, 60 of FIG. 3 operates to combine the inputs on lines, 58, 61 and 63, and to present the combined signal via line, 64, to digital compensator 66. Digital compensator, 66, operates to nullify the error signals on line, 64, and to produce error free command signals on line, 68. Rather than present the signal on line 68 directly to a pulse width modulator, 70, as was done in FIG. 1, the signal on line, 68 is presented to a second combiner, 233, which also receives a signal on a line 234, from a feed forward compensator, 235, connected to receive the signal from selector 46 over a line 236. The feed forward compensator, 235, is used during low speed operation when the feedback compensation from line, 61, is insufficient to operate the system. For example, during low speed operation (<100 RPM) the change in speed as measured by change in time is slow. At this slow speed there is insufficient information to cause control. The feed forward compensator, 235, provides control during the low speed operation. At high speed the authority of the feedback signal is greater than the authority of the feed forward signal and dominates the control. In this case, the feed forward compensation on line, 234, is blended in combiner, 233, to produce the command signal that is presented to the PWM, 70.

As in FIG. 1, PWM, 70, operates to change the command signal so as to produce an average command signal on line, 72. The average command signal on line, 72, is used to control the Motor, 23, at a reduced voltage without the power dissipation encountered by such devices as linear amplifiers. The average command signal on line, 72, is presented to Commutator, 74, which operates to provide a motor drive signal on a line, 76, which is characterized for presentation to the proper winding of the Motor, 23. Since Motor, 23, and its associated components are supplied with power, ps1, on line, 22, which has a reference ground, 21, and since the components of gate array circuit, 32, are supplied with power, ps2, on a line, 30, which has a reference ground, 29, converter, 78, is used to receive the proper signal on line, 76, and to convert it from one having a ground reference, 29, to one having a ground reference, 21. The signal from Converter, 78, is presented to Multiplier, 27, via a line, 80, to provide the final motor drive signal on line, 28. As before, Multiplier, 27, takes the low level command signal average voltage and multiplies it by the bus voltage to create a high current signal capable of actuating the motor to create the desired torque.

In FIG. 3, Motor, 23, produces a signal to a Tachometer, 240, over a line 242. Tachometer, 240, operates to determine the speed of motor, 23, and produce a speed signal on a line, 244, which is presented to a speed derivative scaling box, 250, in the Gate Array circuit, 232. Box, 250, operates to calculate the derivative of the speed signal on line, 244, which, as mentioned, is indicative of the actual torque and this torque signal is supplied to the combiner, 60, via lines, 90 and 61. As discussed above, this signal may not be capable of providing sufficient information during low speed operation and the feed forward compensator, 235, provides this function. The torque signal from box, 250, is also presented to the Digital Interface, 52, via line, 94, to produce a motor torque telemetry signal at the shared digital input/output, 50, in a manner similar to FIG. 1.

FIG. 4, shows the electrical block diagram for the motor control circuit of the second embodiment shown in FIG. 3. As mentioned above, elements and functions which are the same as in FIGS. 1 and 2 will have the same reference numerals, while elements and functions which are different will have new reference numerals. In FIG. 4, Power Bus, 100, is connected to the In Line filters, 102, the Power Switching, 104, the EMI filter, 112, the Energy Storage, 114, the Bus Protect, 116, and the Motor Driver 164 in the same way as in FIG. 2. As before, the Energy Storage, 114, supplies the Secondary Power Supply, 118, to produce outputs "a", "b" and "c", where "a" is preferably +5 volts referenced to ground 29, "b" is preferably +5 volts referenced to ground 21 and "c" is preferably ±12 volts referenced to ground 21 as was the case in FIG. 2.

In FIG. 4, the Gate Array circuit is identified by reference numeral, 320. Gate Array circuit, 320, is powered by voltage "a", as shown by arrow, 122, and contains the elements shown by the following functional blocks: "Telemetry Registers", 130, "Command Registers", 132, "Sequencer", 134, "Dedicated Digital Multiply & Accumulate Computation Unit", 136, "Frame Timer", 138, "Pulse Width Modulator" (PWM) 140, "PWM Counter", 142, "Coefficient ROM", 144, "Clock" 146, and "Commutation Tachometer & Over speed Protection" 148 all of which are the same as in FIG. 2. However, while the block is the same, the function performed by the Dedicated Digital Multiply & Accumulate Computation (MAC) unit, 136, is a little different. In FIG. 4, the MAC, 136, also implements the speed derivative scaling box, 250 and the feed forward compensator, 235 of FIG. 3, in addition to digital filter, 54 and digital compensator 66. These blocks implement all of the functions corresponding to the elements within the dashed lines of the gate array circuit, 232, of FIG. 3. These elements are powered by the voltage "a" from the secondary power circuit 119 from the input shown by arrow 122.

Optional analog command, (AC) 150, external to gate array circuit 120, is shown in FIG. 4 connected to "Slow A/D" converter, 152, which produces a corresponding digital signal that is presented to the "Command Register", 132, in the gate array, 320. "Command Register," 132, also receives the digital command signal identified as "DC," 153, through a buffer, 154. The resulting command signal from Command Register, 132, is presented to the "Dedicated Digital Multiply & Accumulate Computation Unit," 136, which also implements the Select box, 46, of FIG. 3. The output of the "Dedicated Digital Multiply & Accumulate Computation Unit," 136, is presented to PWM", 140.

The commutator, 74, of FIG. 3, is shown in FIG. 4, as a "Commutation Tachometer and Over Speed Protection," 148, which receives the signal from PWM, 140. The "Commutation Tachometer and Over Speed Protection," 148, also receives signal position information from a "Hall Sensor," 155, via line, 156, and receives the clock signal from "Clock," 146, at 61.44 MHz, in the preferred embodiment. "Clock," 146, also presents a clock signal to PWM Counter," 142, which in turn produces count signals to PWM, 140, to frame timer, 138 and to both the "Dedicated Digital Multiply & Accumulate Computation Unit," 136, and the "Sequencer," 134. Sequencer," 134, supplies its signal to the "Dedicated Digital Multiply & Accumulate Computation Unit," 136.

The output signals of the Gate Array circuit, 320, are shown on lines 162 and, as explained above, are referenced to a ground 29. As before, the "Commutation Tachometer and Over Speed Protection" 148, is therefore connected to an Optical Isolator, 160, which converts the electrical signals to optical signals and then transfers them to electrical signals again but referenced to ground, 21, to produce outputs shown by reference numeral, 163, leading to a "Motor Driver", 164.

"Bus Protect", 116, is also connected to "Motor Driver", 164, which, it will be remembered, is powered by sources "b" and "c", referenced to ground, 21, from the "Secondary Power Supply", 119, as seen by arrows 165 and 166.

As in FIG. 2, "Motor Driver," 164 contains the pre-driver circuits and a three phase outputs, φA, φB and φC, for the motor windings shown by reference numerals 167A, 167B and 167C respectively. Hall sensors, 155, provide feedback to the "Commutation Tachometer and Over Speed Protection," 148, over line, 156. The output from Hall sensors, 155, on line 156 is also presented over a line, 332, to the "Dedicated Digital Multiply & Accumulate Computation Unit", 136, where the derivative scaling, 250, and the closed loop summation, 60, of FIG. 3 are completed.

Line 156 from Hall sensors, 155, is also presented, via a line, 334, to buffer, 184, and then to the tachometer output identified as "T", 186, to enable the operator to monitor the motor speed. The derivative scaling calculated torque value, 250, along with a multiplicity of other signal responses that a customer may specify are derived calculations from the "Dedicated Digital Multiply & Accumulate Computation Unit", 136, and are presented to the telemetry register, 130, to provide a signal through buffer 190 to provide an output identified as Digital Telemetry, DT, 191, to enable the operator to monitor the digital signals. Finally, an output from the "Commutator, Tachometer and Over Speed Protection", 148, is presented via lines 330 and 332, to the "Dedicated Digital Multiply & Accumulate Computation Unit", 136, which processes the digital data in the format as specified by customer needs and produces a signal which is sent to the "Telemetry Register", 130, and from there to a buffer, 190, to provide a digital telemetry output identified as "DT", 192, that enables the operator to monitor the digital signals.

The embodiments of FIGS. 3 and 4 provide an improvement over the invention of FIGS. 1 and 2, in that the complexity is reduced and the accuracy is enhanced by elimination of the fast A/D converter and the derivative torque is a more accurate means of feedback than that used in connection with FIGS. 1 and 2. The embodiment of FIGS. 3 and 4 also requires a less complex DC to DC converter.

Both embodiments make for a simpler physical implementation that costs less, is more accurate, and provides for a high volume production device without compromising quality or performance. Many changes and modifications will occur to those skilled in the art and we do not wish to be limited to the specific structures and function details used in connection with the description of the preferred embodiments. For example, different types of PWMs could be used; different types of digital interfaces and other ways of implementing the MAC function could be employed. Also, the optical isolation could be replaced by transformer isolation and other changes may occur to the skilled practitioner. We therefore intend to be limited only by the appended claims.

What is claimed is:

1. A compact motor driver circuit comprising:
   a power source operable to provide a first source of voltage referenced to a first ground and a second source of voltage referenced to a second ground;
   a digital gate array connected to the second source of voltage referenced to the second ground, said digital gate array comprising an input to receive digital motor control commands, a first combiner to combine a motor control command with a feedback signal which may contain unwanted extraneous signals, a compensator connected to receive the combined motor control signal and feedback signal and to remove unwanted extraneous signals to produce a desired motor control signal, and a pulse width modulator to receive the desired motor control signal and operable to produce an average voltage control signal; and
   a motor circuit connected to receive the average voltage control signal, said motor circuit including a first converter to change the average voltage signal from one referenced to the second ground to one referenced to the first ground and to produce a control signal to be presented to a motor, the motor operable to produce a feedback signal,
   a second converter connected to receive the feedback signal and to change the feedback signal from one referenced to the first ground to one referenced to the second ground for presentation to the combiner; and
   a calibration circuit connected to the first combiner to provide compensating signals to accommodate various parameter changes.

2. Apparatus according to claim 1 wherein the parameter changes may include momentum, reaction torque, torque scale factor, wheel speed and bus voltage changes.

3. Apparatus according to claim 1 wherein the calibration circuit comprises a look up table.

4. Apparatus according to claim 1 further including a bus protection circuit connected between the energy storage device and the motor circuit to protect the power source.

5. Apparatus according to claim 1 wherein the signals from the motor circuit are the phased and are presented to a current sensing circuit to produce the feedback signals for the gate array.

6. Apparatus according to claim 1 wherein a tachometer connected to the motor produces an output that is used to produce the feedback signals for the first combiner.

7. Apparatus according to claim 6 further including a second combiner, connected between the compensator and the pulse width modulator and a feed forward compensator connected between the second combiner and the first combiner for use during low speed operation when the feedback signal is insufficient to operate the system.

8. Apparatus according to claim 7 further including a calibration circuit connected to the combiner to provide compensating signals to accommodate various parameter changes.

9. Apparatus according to claim 1 wherein the power source includes an EMI filter and an energy storage device.

10. Apparatus according to claim 9 further including a secondary power supply connected to the energy storage device to supply a plurality of voltages.

11. Apparatus according to claim 1 wherein the first converter includes an optical isolation device that converts electrical signals referenced to the first ground to optical signals and then converts the optical signals to electrical signals referenced to the second ground.

12. Apparatus according to claim 1 wherein the second converter includes an anti-alias filter.

13. A compact motor driver circuit comprising:
   a filter, connected to receive power from a power bus to produce a filtered power signal;
   an energy storage circuit connected to the filter to receive the filtered power signal;
   a plurality of input circuits to receive motor commands signal;
   a selector circuit connected to the input circuits to receive the motor command signals and to produce a selected one;
   a first combiner circuit connected to receive the selected one and a feedback signal, which may contain undesirable components, to produce a combined signal;
   a compensator connected to the receive the combined signal, to remove the undesirable components from the feedback signal and to produce a desired signal;
   a pulse width modulator to receive the desired control signal and operable to produce an average voltage control signal
   an averager to receive the average voltage control signal and to produce a command signal;
   a motor circuit connected to receive the command signal and to produce a three phase motor control signal there from;
   a feedback connection from the motor circuit to the first combiner to supply the feedback signal thereto and
   a calibration circuit connected to the first combiner to provide compensating signals to accommodate various parameter changes.

14. Apparatus according to claim 13, wherein the calibration circuit comprises a look up table.

15. Apparatus according to claim 13 wherein a tachometer is connected to the motor circuit to produce the feedback signal for the first combiner.

16. Apparatus according to claim 15 further including a second combiner, connected between the compensator and the, pulse width modulator and a feed forward compensator connected between the second combiner and the first combiner for use during low speed operation when the feedback signal is insufficient to operate the system.

17. Apparatus according to claim 13 wherein the command signal is referenced to a first ground and the motor circuit is referenced to a second ground.

18. Apparatus according to claim 17 further including an isolation circuit connected to the motor circuit and to receive the command signal and operable to convert electrical signals referenced to the first ground to electrical signals referenced to the second ground.

* * * * *